United States Patent [19]
Henrick

[11] 3,873,586
[45] Mar. 25, 1975

[54] INTERMEDIATES FOR 2,4-DIOLEFINIC FATTY ACIDS AND ESTERS

[75] Inventor: Clive A. Henrick, Palo Alto, Calif.

[73] Assignee: Zoecon Corporation, Palo Alto, Calif.

[22] Filed: Feb. 28, 1973

[21] Appl. No.: 336,666

Related U.S. Application Data

[63] Continuation-in-part of Ser. No. 241,819, April 16, 1972, abandoned.

[52] U.S. Cl............ 260/410.9 R, 260/405, 260/408, 260/413, 260/526 S, 260/340.2, 260/DIG. 44, 424/312, 424/318, 424/DIG. 12
[51] Int. Cl..... C07c 69/52, C07c 59/18, A01n 9/24
[58] Field of Search.............. 260/410.9 R, 408, 413

[56] References Cited
UNITED STATES PATENTS

| | | | |
|---|---|---|---|
| 3,666,780 | 5/1972 | Calame et al. | 260/405 |
| 3,669,997 | 6/1972 | Calame et al. | 260/410.9 R |
| 3,793,353 | 2/1974 | Henrick | 260/405 |

OTHER PUBLICATIONS

Krimer et al., Zhurnal Organicheskoi Khimii, Vol. 7, 7, pp. 1412–1417, July, 1971.

*Primary Examiner*—Lewis Gotts
*Assistant Examiner*—Diana G. Rivers
*Attorney, Agent, or Firm*—Donald W. Erickson; Lee-Louise H. Priest

[57] ABSTRACT

Synthesis di- and tri-unsaturated acids and esters and novel intermediates therefor, and derivatives thereof, useful for the control of insects.

2 Claims, No Drawings

INTERMEDIATES FOR 2,4-DIOLEFINIC FATTY ACIDS AND ESTERS

This is a continuation-in-part of application Ser. No. 241,819, filed Apr. 6, 1972, now abandoned.

This invention relates to novel unsaturated aliphatic compounds of formulas B and C, useful per se for the control of insects and also useful as intermediates in the preparation of other insect control agents of formula A:

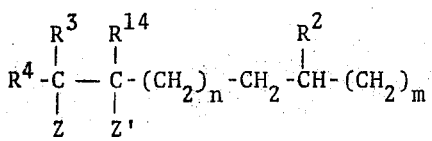
(A)

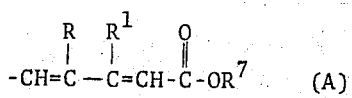

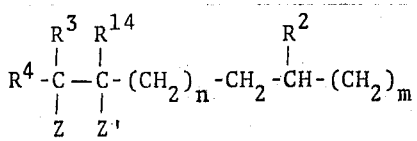
(B)

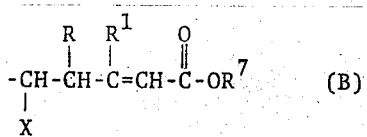

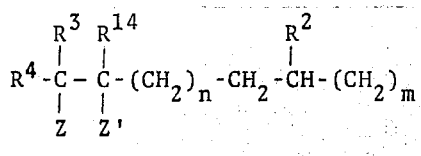
(C)

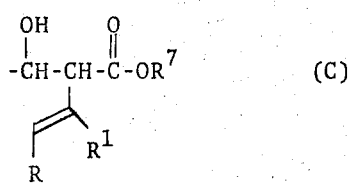

wherein, each of $m$ and $n$ is zero or the positive integer one, two or three;

each of $R^1$, $R^2$, $R^3$ and $R^4$ is lower alkyl;

each of R, $R^7$ and $R^{14}$ is hydrogen or lower alkyl;

Z is hydrogen, lower alkoxy or lower alkyl;

Z' is hydrogen or, taken together with Z, a carbon-carbon bond, and

X is hydroxy, lower acyloxy or chloro.

In the description hereinafter, each of $m$, $n$, R–$R^4$ $R^7$, $R^{14}$, Z, Z' and X is as defined above unless otherwise specified.

In one embodiment of the present invention, compounds of formula A are prepared via compounds of formula B wherein X is hydroxy by the following outlined synthesis:

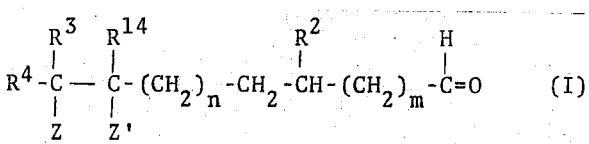
(I)

+

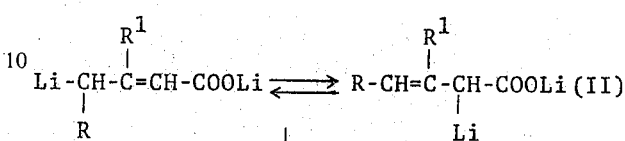
(II)

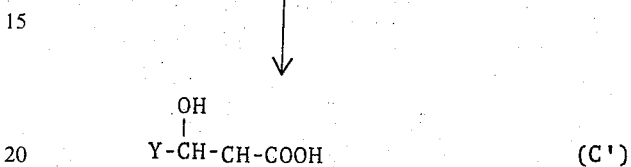
(C')

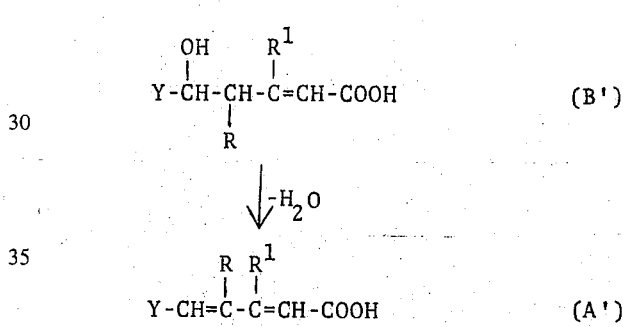
(B')
(A')

wherein Y is the unreactive part of the molecule of a carbonyl compound of formula I, that is:

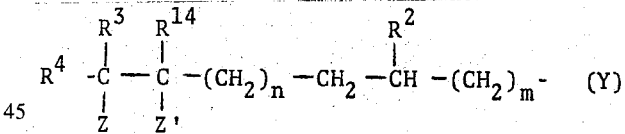
(Y)

In the practice of the above process, a di-lithiated di(lower alkyl) acrylic acid salt (II) is condensed with an aldehyde of formula I at temperatures from about −80°C to about room temperature in an organic solvent such as tetrahydrofuran to give the dianion of a compound of formula C' which rearranges upon heating to the dianion of a compound of formula B'. Compound C' can also be isolated if desired. Dehydration of B' by the usual methods, such as by treatment with phosphorus oxychloride in pyridine, by heating the dilithium salt of B' or B' in pyridine with a carboxylic acid anhydride leading to the C-5 acyloxy derivative (B, X is lower acyloxy) which is then treated with a base such as an alkali metal alkoxide, or by reaction with thionyl chloride followed by treatment with an alcohol, affords the 2,4-diene acid or ester of formula A. In the case where the dehydration procedure yields the acid (A, $R^7$ is H), it can readily be transformed into the ester (A, $R^7$ is lower alkyl) by conventional methods such as by treatment with a diazoalkane or an alkyl-3-p-tolyltriazene.

In the same manner, the hydroxy acids B' and C' can be esterified to obtain the hydroxy esters B (X is hydroxy, $R^7$ is lower alkyl) and C ($R^7$ is lower alkyl).

Acidification of the dilithium salt of B' yields both B' and the lactone E, usually a major amount of lactone E.

Compounds of formula B wherein X is lower acyloxy can alternatively be prepared from the corresponding hydroxy precursors (B, X is hydroxy) by methods known to those skilled in the art such as by reacting with a carboxylic acid anhydride or a carboxylic acid chloride in pyridine.

The 5-chloro substituted compounds of the present invention (B, X is chloro) are prepared by the reaction of a tertiary phosphine, such as triphenylphosphine, and carbon tetrachloride with a 5-hydroxy ester compound of formula B (X is hydroxy; $R^7$ is lower alkyl) under anhydrous conditions.

The 5-hydroxy compounds of formula B serve also as precursors for other useful insect control agents of the present invention of formula D:

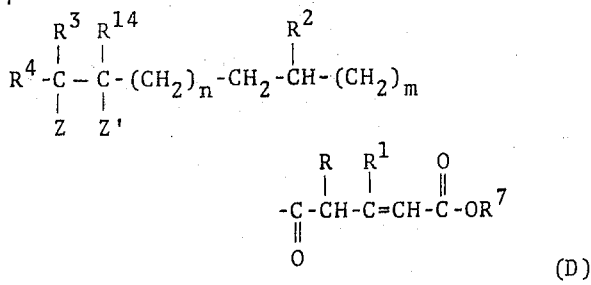

(D)

The novel 5-oxo compounds of formula D can be prepared by oxidation of the 5-hydroxy compounds B using appropriate oxidizing agents such as chromium trioxide-pyridine complex in methylene dichloride at about 0°C, manganese dioxide in chloroform for several hours, etc.

In another embodiment of the present invention, an aldehyde of formula I is condensed with the lithium salt of a di-(lower alkyl) acrylic ester (III)

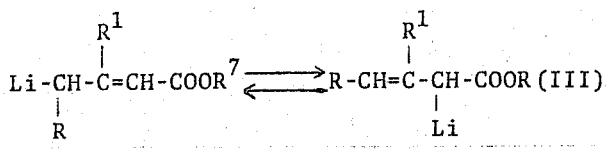

at low temperatures of about −80°C in tetrahydrofuran to give directly the anion of an ester of formula C ($R^7$ is lower alkyl) which, by warming in situ, yields a mixture of the hydroxy ester B (X is hydroxy; $R^7$ is lower alkyl) and a ε-lactone E:

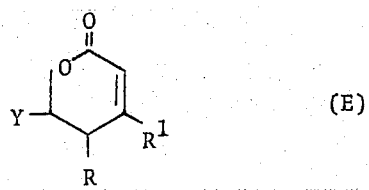

(E)

These compounds are separated by chromatography and B (X is hydroxy, $R^7$ is lower alkyl) can be further processed as previously described to give the other intermediates of the present invention and ultimately the products of formula A. The ε-lactone E can be either converted into B by treatment with an aqueous or methanolic alkali metal hydroxide or into A ($R^7$ is hydrogen) by treatment with an alkali metal alkoxide in a dry alcohol solvent.

The preparation of lithiated carboxylic acid and ester salts and their addition to carbonyl compounds has been described by Tanabe and Peters, J. Org. Chem. 36, 2403 (1971); Moersch and Burkett, J. Org. Chem. 36, 1149 (1971); Pfeffer and Silbert, J. Org. Chem. 36, 3290 (1971); Watanabe et al, Chem. and Ind, 80 (1972), Rathke, M.W., J. Amer. Chem. Soc. 92, 3222 (1970), and Rathke and Lindert, J. Am. Chem. Soc. 93, 2318 (1971). The opening of ε-lactone rings into 2,4-dienoic acids has been reported by Eiter et al., Angew. Chem. 72, 948 (1960), and by Eisner et. al., J. Chem. Soc., 1372 (1953)

Alternatively, the compounds of the present invention can be obtained via a Reformatsky reaction by condensing a carbonyl compound of formula I with a γ-halo di-(lower alkyl) acrylic acid ester in the presence of zinc followed by dehydration of the resulting 5-hydroxy ester to give the 2,4-dienoic products of formula A. See, for example, Harper and Oughton, Chem. and Ind., 574 (1950).

The starting material aldehydes of formula I are described in copending applications Ser. No. 187,897 and Ser. No. 187,898, filed Oct. 8, 1971, now U.S. Pat. Nos. 3,755,411 and 3,752,893 respectively, the disclosures of which are hereby incorporated by reference. Many of said aldehydes are also commercially available.

The compounds of formulas A, B, C, D and E are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for Heteropterans, such as Lygaeidae, Miridae and Pyrrhocoridae; Homopterans, such as Aphididae, Coccidae and Jassidae; Lepidopterans, such as Pyralidae, Noctuidae and Gelechiidae; Coleopterans, such as Tenebrionidae, Crysomelidae and Dermestidae; Dipterans, such as Culicidae, Muscidae and Sarcophagidae; and other insects. The compounds can be applied at low dosage levels of the order of 0.01 μg. to 10 μg. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more of the above mentioned compounds. Generally, a concentration of less than 25% of the active compound is employed. The formulations can include insect attractants, emulsifying agents or wetting agents to assist in the application and effectiveness of the active ingredient.

The term "lower alkyl," as used herein, refers to a straight or branched chain saturated aliphatic hydrocarbon group having a chain length of one to six carbon atoms, e.g., methyl, ethyl, propyl, i-propyl, n-butyl, s-butyl, t-butyl, pentyl and hexyl.

The term "lower alkoxy," as used herein, refers to an alkoxy group of one to six carbon atoms such as methoxy, ethoxy, isopropoxy and the like. The term "lower acyloxy," as used herein, refers to a hydrocarbon carboxylic acyloxy group of one to six carbon atoms such as acetoxy, isopropionyloxy, and the like.

The following examples are provided to illustrate the practice of the present invention. Temperature is given in degrees Centigrade.

EXAMPLE 1

A. To 4.57 ml of di-isopropylamine (32.76 mmol) in 150 ml of dry tetrahydrofuran, under nitrogen and at 0°, is added by means of a syringe 20.60 ml of a 1.6M solution of n-butyllithium (32.75 mmol) in hexane. The mixture is stirred for 0.5 hour at 0° and then for about 3 hours at room temperature. The solution is then cooled to 0° and 1.56 g. of dimethylacrylic acid (15.6 mmol) in 25 ml of dry tetrahydrofuran is added dropwise and stirring is continued for 0.5 hour at 0° and then at 40°–50° for about 1.5 hour.

B. To the above prepared dianion solution, stirred under nitrogen at 0°, is slowly added a solution of 2.43 g. of 3,7-dimethyloctan-1-al (15.6 mmol) in 20 ml of dry tetrahydrofuran and the mixture is stirred for 0.5 hour at 0° and then overnight at room temperature. After cooling in an ice-bath, the reaction mixture is decomposed by the slow addition of 200 ml of 1N hydrochloric acid. The organic layer is separated and the aqueous layer extracted with ether. The combined organic phases are then extracted with 0.1 N NaOH solution, which is then cooled, acidified with 3N hydrochloric acid and extracted with ether. The ether extracts are combined, dried over calcium sulfate and evaporated in vacuo to yield 3-hydroxy-2-isopropenyl-5,9-dimethyldecanoic acid.

EXAMPLE 2

A solution of 0.904 g. of 1-ethyl-3-p-tolytriazene in 15 ml of ether is added to a solution of 1 g of 3-hydroxy-2-isopropenyl-5,9-dimethyldecanoic acid in 20 ml of ether and a few boiling chips are added to induce evolution of nitrogen gas. The mixture is warmed to 30°–40° for about 3 hours and then diluted with 25 ml of 10% aqueous hydrochloric acid. The ether layer is separated and washed once with 10% HCl, twice with 10% $Na_2CO_3$ and once with brine, dried over calcium sulfate and concentrated to give ethyl 3-hydroxy-2-isopropenyl-5,9-dimethyldecanoate, which can be purified by distillation or chromatography.

EXAMPLE 3

Following the procedure of Example 1, Part A, 18.28 ml (131.04 mmol) of di-isopropyl amine in 500 ml of dry tetrahydrofuran is treated with 82.4 ml (131.04 mmol) of 1.6 M solution of nbutyllithium in hexane and then reacted with 6.24 g (62.4 mmol) of dimethylacrylic acid in 75 ml of dry tetrahydrofuran.

To the lithiated acid dianion prepared above, stirring at 0° under nitrogen, is added a solution of 9.72 g of 3,7-dimethyloctan-1-al (62.4 mmol) in 25 ml of dry tetrahydrofuran. The mixture is stirred at 0° for 0.5 hour, at room temperature for 4 hours and then heated to reflux for about 16 hours. The reaction is worked up as described in Part B of Example 1. The acidic fraction affords 5-hydroxy-3,7,11-trimethyldodec-2-enoic acid and the neutral fraction (base wash) affords lactone E (5-(2',6'-dimethylheptyl)-3-methylpent-2-eno-5-lactone).

EXAMPLE 4

A solution with 1.8 g of 5-hydroxy-3,7,11-trimethyldodec-2-enoic acid in 10 ml of dry tetrahydrofuran is stirred at room temperature under nitrogen and treated with 1.5 ml of acetic anhydride and 10 ml pyridine in 25 ml of tetrahydrofuran. The reaction mixture is allowed to stir at room temperature for 24 hours. The reaction is quenched with 1N hydrochloric acid and extracted with ether. The organic phase is washed with water and then with brine, dried over calcium sulfate and the solvent removed at reduced pressure to give 5-acetoxy-3,7,11-trimethyldodec-2-enoic acid.

EXAMPLE 5

To a solution of 0.3 g of 5-acetoxy-3,7,11-trimethyldodec-2-enoic acid in 50 ml of ether is added an ethereal solution of diazomethane in excess. After 2 hours, the reaction is quenched with acetic acid and evaporated. The residue is dissolved in ether, washed with saturated sodium bicarbonate and water, dried over calcium sulfate and evaporated at low pressure to yield methyl 5-acetoxy-3,7,11-trimethyldodec-2-enoate, which can be purified by distillation or chromatography.

By use of diazoethane in place of diazomethane in the process of this example, there is obtained ethyl 5-acetoxy-3,7,11-trimethyldodec-2-enoate.

EXAMPLE 6

1-(i-propyl)-3-p-tolyltriazene (2.54 g) in 50 ml of dry ether is added to 5-hydroxy-3,7,11-trimethyldodec-2-enoic acid (2 g) in 25 ml of dry ether. Boiling stones are added and the reaction mixture is refluxed for 3 hours. The reaction is quenched by adding 1N hydrochloric acid until evolution of $N_2$ ceases. The ether layer is washed with 1N HCl, 10% $Na_2CO_3$ solution and brine, and dried over calcium sulfate. Removal of the ether at reduced pressure yields isopropyl 5-hydroxy-3,7,11-trimethyldodec-2-enoate which can be purified by chromatography and distillation.

EXAMPLE 7

To a solution of 6 g of isopropyl 5-hydroxy-3,7,11 trimethyldodec-2-enoate in 100 ml of dry carbon tetrachloride is added portionwise 5.5 g of dry triphenylphosphine. The mixture is heated to reflux, with protection from atmospheric moisture, for about 1 hour. After cooling, the precipitate of triphenyl phosphine oxide is filtered off and the filtrate is evaporated under reduced pressure to give isopropyl 5-chloro-3,7,11-trimethyldodec-2-enoate, which can be purified by chromatography.

EXAMPLE 8

A solution of 3 g of isopropyl 5-hydroxy-3,7,11-trimethyldodec-2-enoate in pyridine is added to a solution of 2.2 molar equivalents of chromium trioxide/2 pyridine complex in methylene dichloride, at 0°. After addition is complete, the reaction mixture is left for 1 hour and then poured into saturated sodium bicarbonate and extracted with methylene dichloride. The combined methylene dichloride extracts are washed with water and brine, dried on calcium sulfate and evaporated at reduced pressure to yield isopropyl 5-oxo 3,7,11-trimethyldodec-2-enoate.

EXAMPLE 9

A mixture of 3 g of isopropyl 5-hydroxy-3,7,11-trimethyldodec-2-enoate, 1.5 molar equivalents of activated manganese dioxide and 50 ml of chloroform is prepared at 0°, under nitrogen, by slow addition of manganese dioxide. The reaction mixture is allowed to stir for about 24 hours and then filtered. The filter cake is washed with hexane and the combined washings and filtrate evaporated to give crude isopropyl 5-oxo-3,7,11-trimethyldodec-2-enoate which can be purified by chromatography.

EXAMPLE 10

To a solution of 8 g of isopropyl 5-hydroxy-3,7,11-trimethyldodec-2-enoate and pyridine, at 0°, is added 1.2 molar equivalents of phosphorus oxychloride. The reaction mixture is left at 0° for 2 hours and then warmed to 60° for 5 hours. After cooling, the mixture is diluted with water and then extracted with ether. The combined ether extracts are washed with dilute aqueous HCl and aqueous NaHCO₃, dried over calcium sulfate and evaporated under reduced pressure to give isopropyl 3,7,11-trimethyldodeca-2,4-dienoate which can be purified by distillation.

EXAMPLE 11

Thionyl chloride (3 molar equivalents) is added to a stirred solution of 0.75 g of 5-hydroxy-3,7,11-trimethyldodec-2-enoic acid in 30 ml of benzene and 5 ml of pyridine under nitrogen. The mixture is refluxed for about 2 hours and then allowed to stand for 3 hours. Ethanol (5 ml) is added and, after stirring for 2 hours, the reaction is poured into water and extraced with ether. The organic layer is separated and washed with aqueous sodium bicarbonate and brine, dried over calcium sulfate and concentrated under reduced pressure to yield ethyl 3,7,11-trimethyldodeca-2,4-dienoate which is purified by chromatography.

By using other alcohols in the above procedure in place of ethanol, such as propanol, isopropanol, t-butanol, isobutanol, etc., the corresponding esters are obtained, e.g., propyl 3,7,11-trimethyldodeca-2,4-dienoate,
isopropyl 3,7,11-trimethyldodeca-2,4-dienoate,
t-butyl 3,7,11-trimethyldodeca-2,4-dienoate,
isobutyl 3,7,11-trimethyldodeca-2,4-dienoate.

EXAMPLE 12

To a solution of 2,5 g of methyl 5-acetoxy-3,7,11-trimethyldodec-2-enoate in 50 ml of dry tetrahydrofuran is added under nitrogen 0.8 g of potassium t-butoxide. The mixture is heated to reflux for 5 hours. After cooling, water and ether are added and the organic layer is washed with brine and dried over calcium sulfate. Removal of the solvent in vacuo affords methyl 3,7,11-trimethyldodec-2,4-dienoate.

EXAMPLE 13

Each of the aldehydes under Column I is condensed with lithiated dimethyl acrylic acid dianion according to the process of Example 1, Parts A and B, to prepare the respective hydroxy acids under Column II.

I 3,7-dimethyloct-6-en-1-al
3,9-dimethyldec-8-en-1-al
3,7-dimethylnon-6-en-1-al
3,7,7-trimethyloctan-1-al
7-methoxy-3,7-dimethyloctan-1-al
6-ethoxy-3,5,6-trimethylheptan-1-al

II 3-hydroxy-2-isopropenyl-5,9-dimethyldec-8-enoic acid,
3-hydroxy-2-isopropenyl-5,11-dimethyldodec-10-enoic acid,
3-hydroxy-2-isopropenyl-5,9-dimethylundec-8-enoic acid,
3-hydroxy-2-isopropenyl-5,9,9-trimethyldecanoic acid,
3-hydroxy-2-isopropenyl-9-methoxy-5,9-dimethyldecanoic acid,
3-hydroxy-2-isopropenyl-8-ethoxy-5,7,8-trimethylnonanoic acid, The above acids are esterified with a diazoalkane or an alkyl-3-p-tolytriazene, following the procedures of Examples 2, 5 or 6, to obtain the corresponding esters, e.g., methyl-3-hydroxy-2-isopropenyl-5,9-dimethyldec-8-enoate, ethyl 3-hydroxy-2-isopropenyl-5,11-dimethyldodec-10-enoate, propyl-3-hydroxy-2-isopropenyl-5,9-dimethylundec-8-enoate, etc.

EXAMPLE 14

The dianions of each of the hydroxy acids of Example 13, Column II, is refluxed in tetrahydrofuran as described in Example 3 (last paragraph) to produce the corresponding 5-hydroxy acids, which can be esterified in the usual way to yield the 5-hydroxy esters.

By using in the procedure of this example the anion of each of the ester derivatives, e.g., the ethyl ester, instead of the corresponding dianion of Example 13, there is obtained the respective 5-hydroxy ester, that is:

ethyl 5-hydroxy-3,7,11-trimethyldodeca-2,10-dienoate;
ethyl 5-hydroxy-3,7,13-trimethyltetradeca-2,12-dienoate;
ethyl 5-hydroxy-3,7,11-trimethyltrideca-2,10-dienoate;
ethyl 5-hydroxy-3,7,11,11-tetramethyldodec-2-enoate;
ethyl 5-hydroxy-11-methoxy-3,7,11-trimethyldodec-2-enoate;
ethyl 5-hydroxy-10-ethoxy-3,7,9,10-tetramethylundec-2-enoate.

Acetylation of the thus-prepared 5-hydroxy-esters with acetic anhydride, affords the corresponding 5-acetoxy compounds, e.g., ethyl 5-acetoxy-3,7,11-trimethyldodeca-2,10-dienoate; ethyl 5-acetoxy-3,7,13-trimethyltetradeca-2,12-dienoate; ethyl 5-acetoxy-3,7,11-trimethyltrideca-2,10-dienoate; etc.

EXAMPLE 15

Dehydration of each of the 5-hydroxy compounds of Example 14 is accomplished by use of the methods described in Examples 10 or 11, to prepare the di- and tri-unsaturated esters under Column III, which are equally obtained by dehydrating the 5-acetoxy derivatives of Example 14 via the procedure of Example 12.

III ethyl 3,7,11-trimethyldodeca-2,4,10-trienoate;
ethyl 3,7,13-trimethyltetradeca-2,4,12-trienoate;
ethyl 3,7,11-trimethyltrideca-2,4,10-trienoate;
ethyl 3,7,11,11-tetramethyldodeca-2,4,-dienoate;
ethyl 11-methoxy-3,7,11-trimethyldodeca-2,4-dienoate;

ethyl 10-ethoxy-3,7,9,10-tetramethylundeca-2,4-dienoate.

EXAMPLE 16

Each of the 5-hydroxy esters of Example 14 is converted into the corresponding 5-chloro compound following the procedure of Example 7 i.e.

ethyl 5-chloro-3,7,11-trimethyldodeca-2,10-dienoate;
ethyl 5-chloro-3,7,13-trimethyltetradeca-2,12-dienoate;
ethyl 5-chloro-3,7,11-trimethyltrideca-2,10-dienoate;
ethyl 5-chloro-3,7,11,11-tetramethyldodec-2-enoate;
ethyl 5-chloro-11-methoxy-3,7,11-trimethyldodec-2-enoate;
ethyl 5-chloro-10-ethoxy-3,7,9,10-tetramethylundec-2-enoate.

EXAMPLE 17

By following the procedures of Examples 8 or 9, each of the 5-hydroxy esters of Example 14 is oxidized to the respective 5-oxo compound, i.e.

ethyl 5-oxo-3,7,11-trimethyldodeca-2,10-dienoate;
ethyl 5-oxo-3,7,13-trimethyltetradeca-2,12-dienoate;
ethyl 5-oxo-3,7,11-trimethyltrideca-2,10-dienoate;
ethyl 5-oxo-3,7,11,11-tetramethyldodec-2-enoate;
ethyl 5-oxo-11-methoxy-3,7,11-trimethyldodec-2-enoate;
ethyl 5-oxo-10-ethoxy-3,7,9,10-tetramethylundec-2-enoate.

EXAMPLE 18

A. Lithium di-isopropyl amide is prepared as described in Example 1, Part A, by reacting equimolar amounts of di-isopropyl amine and n-butyllithium (1.6M solution in hexane) in dry tetrahydrofuran. To one molar equivalent of the thus-prepared amide, cooled to −78° and stirring under nitrogen, is added one molar equivalent of ethyl dimethylacrylate in dry tethydrofuran, dropwise, and the mixture stirred under nitrogen at −78° for about 2 hours B. To the above prepared solution of lithio ethyl dimethylacrylate, maintained at −78° in a dry and inert atmosphere, is added one molar equivalent of 3,7-dimethyloctan-1-al in dry tetrahydrofuran. The mixture is stirred at −78° for about 1 hour to yield the lithium salt of ethyl 3-hydroxy-2-isopropenyl-5,9-diemthyldecanoate. Quenching at −78° with dilute HCl acid gives ethyl 3-hydroxy-2-isopropenyl-5,9-dimethyldecanoate.

C. The lithium salt of ethyl 3-hydroxy-2-isopropenyl-5,9-dimethyldecanoate is further processed by allowing the reaction mixture to come to room temperature and then maintaining at room temperature for about 2 hours. Quenching with dilute hydrochloric acid followed by extraction with ether, washing of the organic phase with brine, drying over calcium sulfate and evaporation of the solvent in vacuo, gives a mixture of ethyl 5-hydroxy-3,7,11-trimethyldodec-2-enoate and 5-(2',6'-dimethylheptyl)-3-methylpent-2-eno-5-lactone which are separated by chromatography on silica plates eluting with ether:hexane (1:1).

EXAMPLE 19

A mixture of 0.5 g of 5-(2',6'-dimethylheptyl)-3-methyl-pent-2-eno-5-lactone and 20 ml of 10% aqueous sodium hydroxide is shaken at room temperature for about 5 hours. The solution is then acidified with 10% aqueous sulfuric acid and extracted with ether. The ether extracts are washed with brine, dried over calcium sulfate and concentrated to yield a mixture of 5-hydroxy-3,7,11-trimethyldodec-2-enoic acid and starting lactone.

EXAMPLE 20

To 1.2 g of 5-(2',6'-dimethylheptyl)-3-methylpent-2-eno-5-lactone in 50 ml of methanol is added 0.3 g of sodium methoxide and the mixture stirred at room temperature for about 7 hours. The volume is reduced to half by removal of solvent under vacuum. Water is added and the solution acidified with dilute hydrochloric acid and then extracted with ether. The organic layer is separated and washed with water and brine, dried over calcium sulfate and evaporated at reduced pressure to give 3,7,11-trimethyldodeca-2(cis),4(trans)-dienoic acid.

EXAMPLE 21

A solution of 4.8 g of 3,7-dimethyloctan-1-al, 4.2 g of ethyl γ-bromo-β,β-dimethylacrylate and 50 ml of anhydrous benzene is slowly and carefully added to a flask containing 2.3 g of zinc powder and equipped with a magnetic stirrer, a dropping funnel and a reflux condenser. The reaction mixture is gently heated to initiate reaction. After addition is complete, the mixture is refluxed for about 1 hour. The mixture is then cooled and poured onto ice, acidified with dilute cold sulfuric acid and extracted with ether. The organic phase is washed with water, dried over magnesium sulfate and the solvent evaporated in vacuo to give ethyl 5-hydroxy-3,7,11-trimethyldodec-2-enoate.

Dehydration of this 5-hydroxy ester by the methods previously described in the present invention, yields ethyl 3,7,11-trimethyldodeca-2,4-dienoate.

EXAMPLE 22

To a solution of 18.3 ml of diisopropylamine in 500 ml of tetrahydrofuran at 0° under $N_2$ is added dropwise, with stirring, a solution of 82.5 ml (1.59M) n-butyllithium in hexane. After stirring 1 hour at 0° and then 3 hours at room temperature dimethylacrylic acid (6.24 g) in 75 ml of tetrahydrofuran is added. After stirring for 2 hours at 50°, the mixture is cooled to 0° and a solution of dihydrocitronellae (9.7 g) in 25 ml tetrahydrofuran is added. After stirring for 4 hours at room temperature, the mixture is refluxed overnight. To this solution of the dianion is added at room temperature 12 ml of acetic anhydride. The mixture is stirred at room temperature for 3 hours and then heated under reflux overnight. The reaction mixture is cooled and then poured into ice cold 1N aqueous hydrochloric acid and extracted with ether (2X). The combined organic phase is washed with water and then ice cold 0.1N NaOH aqueous. Immediate acid-ification of the basic washes with ice cold 3N HCl and extraction with ether, followed by water washes,.drying over calcium sulfate and evaporation gives 5-acetoxy-3,7,11-trimethyldodec-2-enoic acid.

What is claimed is:

1. A compound selected from those of the formula:

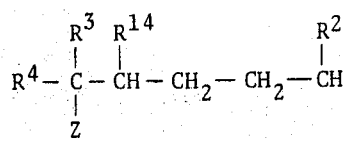
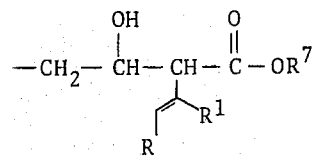
wherein,
Z is hydrogen or methoxy;
each of $R^1$, $R^2$, $R^3$ and $R^4$ is methyl or ethyl;
each of R and $R^{14}$ is hydrogen or methyl; and
$R^7$ is hydrogen, methyl, ethyl or isopropyl.
2. A compound according to claim 1 wherein each of $R^2$, $R^3$ and $R^4$ is methyl and $R^{14}$ is hydrogen.
* * * * *